(12) United States Patent
Chen

(10) Patent No.: US 9,958,702 B1
(45) Date of Patent: May 1, 2018

(54) EYEGLASSES ASSEMBLY STRUCTURE HAVING NOSE SUPPORT

(71) Applicant: PROHERO GROUP CO., LTD., Tainan (TW)

(72) Inventor: Pen-Wei Chen, Tainan (TW)

(73) Assignee: Prohero Group Co., Ltd., Tainan (TW)

( * ) Notice: Subject to any disclaimer, the term of this patent is extended or adjusted under 35 U.S.C. 154(b) by 0 days. days.

(21) Appl. No.: 15/487,755

(22) Filed: Apr. 14, 2017

(51) Int. Cl.
*G02C 5/12* (2006.01)

(52) U.S. Cl.
CPC ......... *G02C 5/126* (2013.01); *G02C 2200/08* (2013.01)

(58) Field of Classification Search
CPC ....... G02C 5/12; G02C 2200/08; G02C 5/126
USPC ................ 351/136, 138, 65, 78, 80
See application file for complete search history.

(56) References Cited

U.S. PATENT DOCUMENTS

| 5,257,050 A | * | 10/1993 | Wiedner | A61F 9/025 351/138 |
| 7,347,545 B1 | * | 3/2008 | Jannard | G02C 1/04 351/106 |
| 8,931,894 B1 | * | 1/2015 | Chen | G02C 1/10 351/103 |

* cited by examiner

*Primary Examiner* — Hung Dang
(74) *Attorney, Agent, or Firm* — Rosenberg, Klein & Lee

(57) ABSTRACT

An eyeglasses assembly structure having a nose support is disclosed herein. It comprises a frame having an assembly holder disposed in a middle bottom portion thereof, wherein the assembly holder is provided with a receiving slot, and the receiving slot is provided with a first inner surface having a protrusion thereof and a second inner surface having a recess thereon; and a nose support having an inserting part for inserting into the receiving slot of the assembly holder of the frame, wherein the inserting part is provided with a first outer surface having an engaging slot for correspondingly engaging with the protrusion and a second outer surface having an engaging block for correspondingly engaging with the recess.

1 Claim, 4 Drawing Sheets

EYEGLASSES ASSEMBLY STRUCTURE HAVING NOSE SUPPORT

BACKGROUND OF THE INVENTION

1. Field of the Invention

The present invention relates to provide an eyeglasses assembly structure having a nose support which has an inserting part on the nose support to be directly engaged with a receiving slot of a frame for positioning so as to be assembled or disassembled from the frame easily without the need of other tools as well as prevent detachment from the frame accidentally, and to be engaged with an interior of the assembly holder so that the overall appearance of a pair of glasses is unaffected by the bonding elements.

2. Description of Related Art

Various eyeglasses, e.g. optical glasses, sunglasses, sport glasses and safety glasses, have different design for frame structure according to specific purpose and function. For instance, full-frame eyeglasses having a frame for enclosing a lens firmly are usually utilized as expensive optical glasses, whereas half-frame eyeglasses having a relative light weight are usually utilized as sunglasses, sport glasses, or safety glasses to increase users' expedience in outdoor activities, sports or construction work. Whether the eyeglasses are full-frame or half-frame form, they share the same characteristic of assembling a nose support to a middle bottom portion of the frame by fastening elements so that the eyeglasses can be placed and positioned on the nose.

The nose supports of the traditional eyeglasses structures are usually assembled to the frames by screwing the screw components on through holes of the nose supports. Although the abovementioned eyeglasses achieve various expected efficacy, e.g. positioning the frames on the nose and reducing discomfort of wearing the eyeglasses, they have some restrictions on the overall structural design that need to be improved. For instance, the nose supports must be assembled to the frames by screw components and other tools, so they cannot be attached to or detached from each other arbitrarily, and the screw components are prone to fall off from the glasses accidentally after the eyeglasses are is used for a long time. Furthermore, the screw components exposed to the exterior of the glasses may affect the overall appearance of the eyeglasses

SUMMARY OF THE INVENTION

In view of the above-mentioned problems, the object of the present invention is to provide an eyeglasses assembly structure having a nose support which has an inserting part on the nose support to be directly engaged with a receiving slot of a frame for positioning. Accordingly, the nose support of the present invention can be assembled or disassembled from the frame easily without the need of other tools, and thus prevent detachment from the frame accidentally. Furthermore, the inserting part is engaged with an interior of the assembly holder so that the overall appearance of a pair of glasses is unaffected by the bonding elements.

Disclosed herein is an eyeglasses assembly structure having a nose support. It comprises a frame having an assembly holder disposed in a io middle bottom portion thereof, wherein the assembly holder is provided with a receiving slot, and the receiving slot is provided with a first inner surface having a protrusion thereof and a second inner surface having a recess thereon; and a nose support having an inserting part in a middle portion thereof to engage with the receiving slot of the assembly holder of the frame, wherein the inserting part is provided with a first outer surface having an engaging slot for correspondingly engaging with the protrusion of the first inner surface of the receiving slot, and a second outer surface having an engaging block for correspondingly engaging with the recess of the second inner surface of the receiving slot.

DETAILED DESCRIPTION OF THE PREFERRED EMBODIMENT

Hereinafter, an exemplary embodiment of the present invention will be described in detail with reference to the accompanying drawings.

Figure 1:
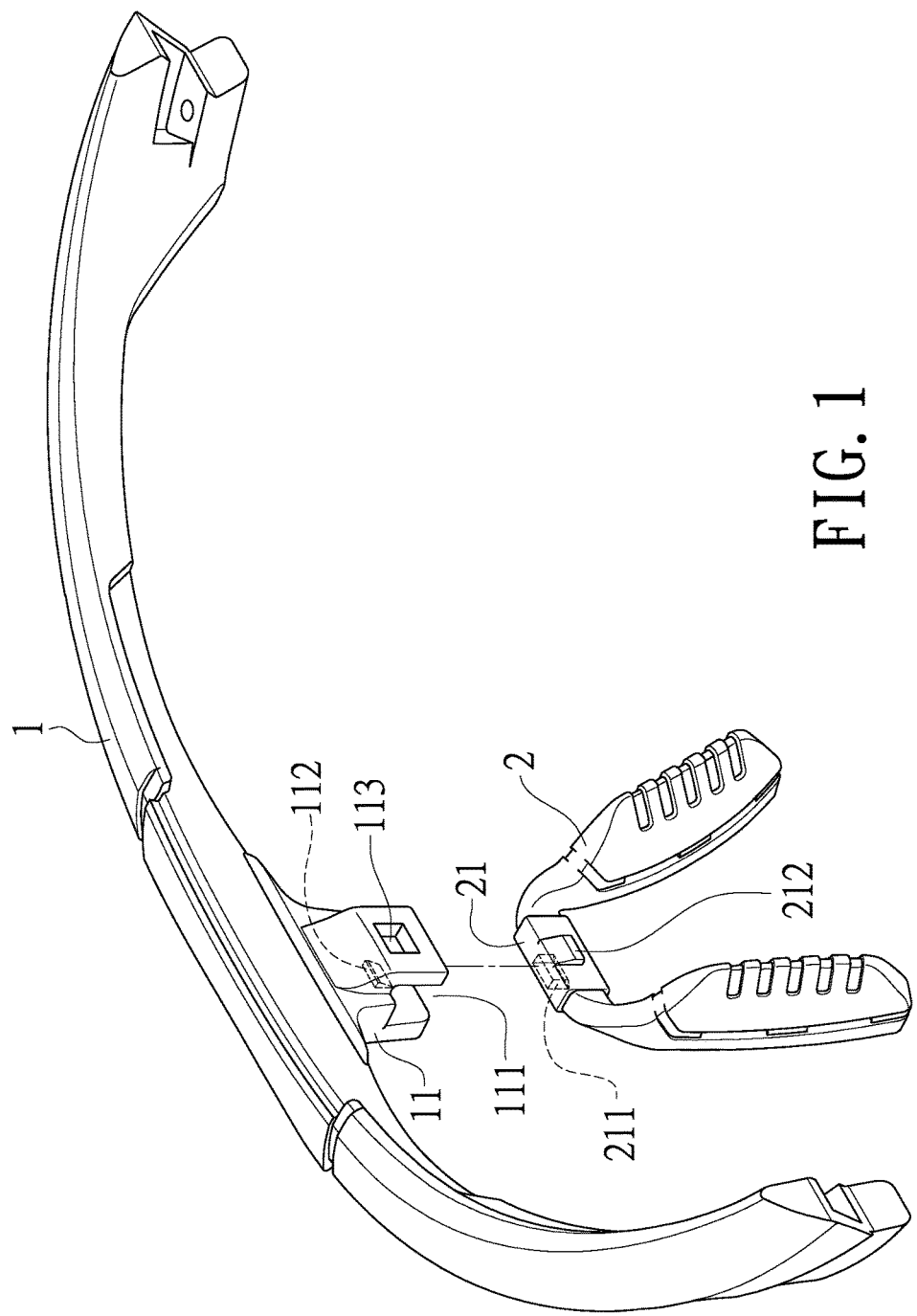
FIG. 1 is an exploded diagram showing an eyeglasses assembly structure having a nose support according to the present invention.
Figure 2:
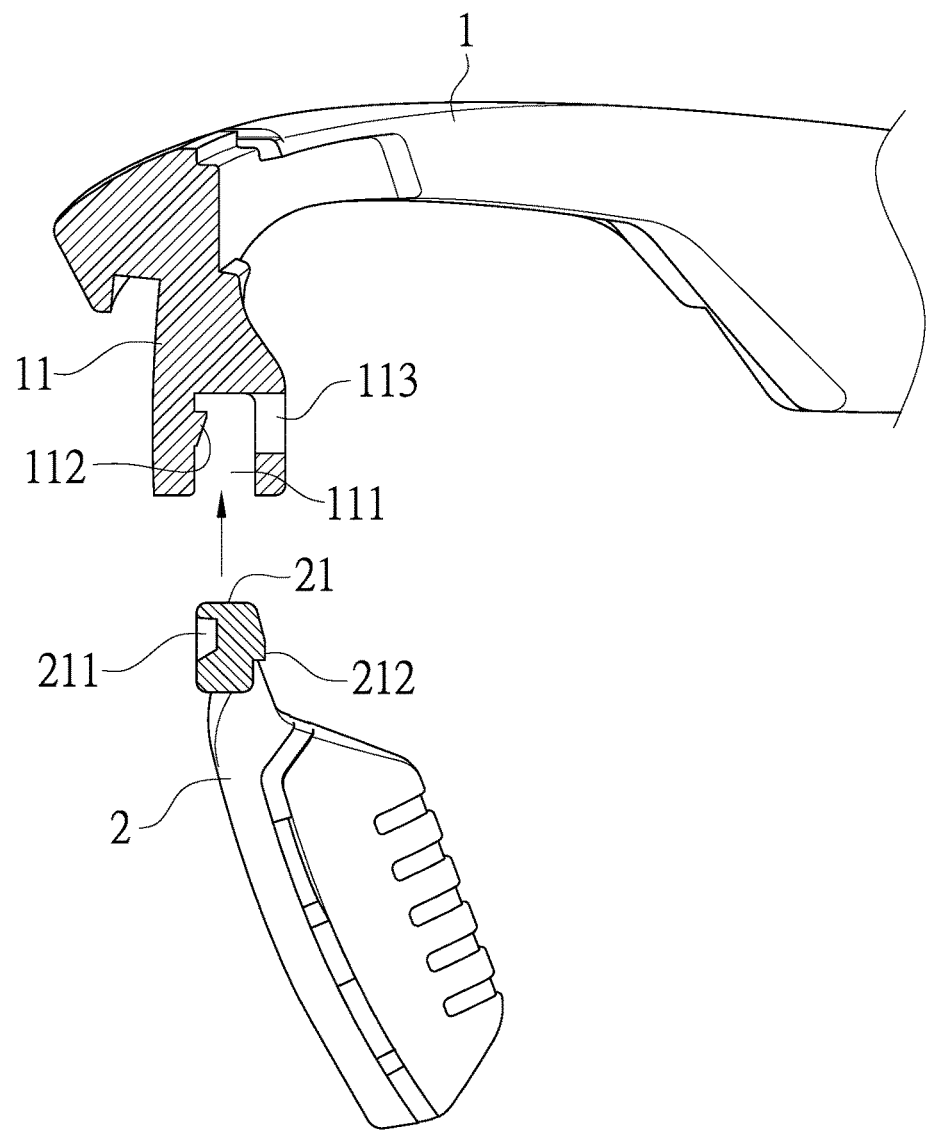
FIG. 2 is a partial lateral view showing an eyeglasses assembly structure having a nose support according to the present invention.

As showed in FIG. 1 and FIG. 2, a an exploded diagram and a partial lateral view showing an eyeglasses assembly structure having a nose support according to the present invention are disclosed. The eyeglasses assembly structure having a nose support mainly comprises:

a frame (1) having an assembly holder (11) disposed in a middle bottom portion thereof, wherein the assembly holder (11) is provided with a receiving slot (111), and the receiving slot (111) is provided with a first inner surface having a protrusion (112) thereof and a second inner surface having a recess (113) thereon; and a nose support (2) having an inserting part (21) in a middle portion thereof to engage with the receiving slot (111) of the assembly holder (11) of the frame (1), wherein the inserting part (21) is provided with a first outer surface having an engaging slot (211) for correspondingly engaging with the protrusion (112) of the first inner surface of the receiving slot (111), and a second outer surface having an engaging block (212) for correspondingly engaging with the recess (113) of the second inner surface of the receiving slot (111).

Figure 3:
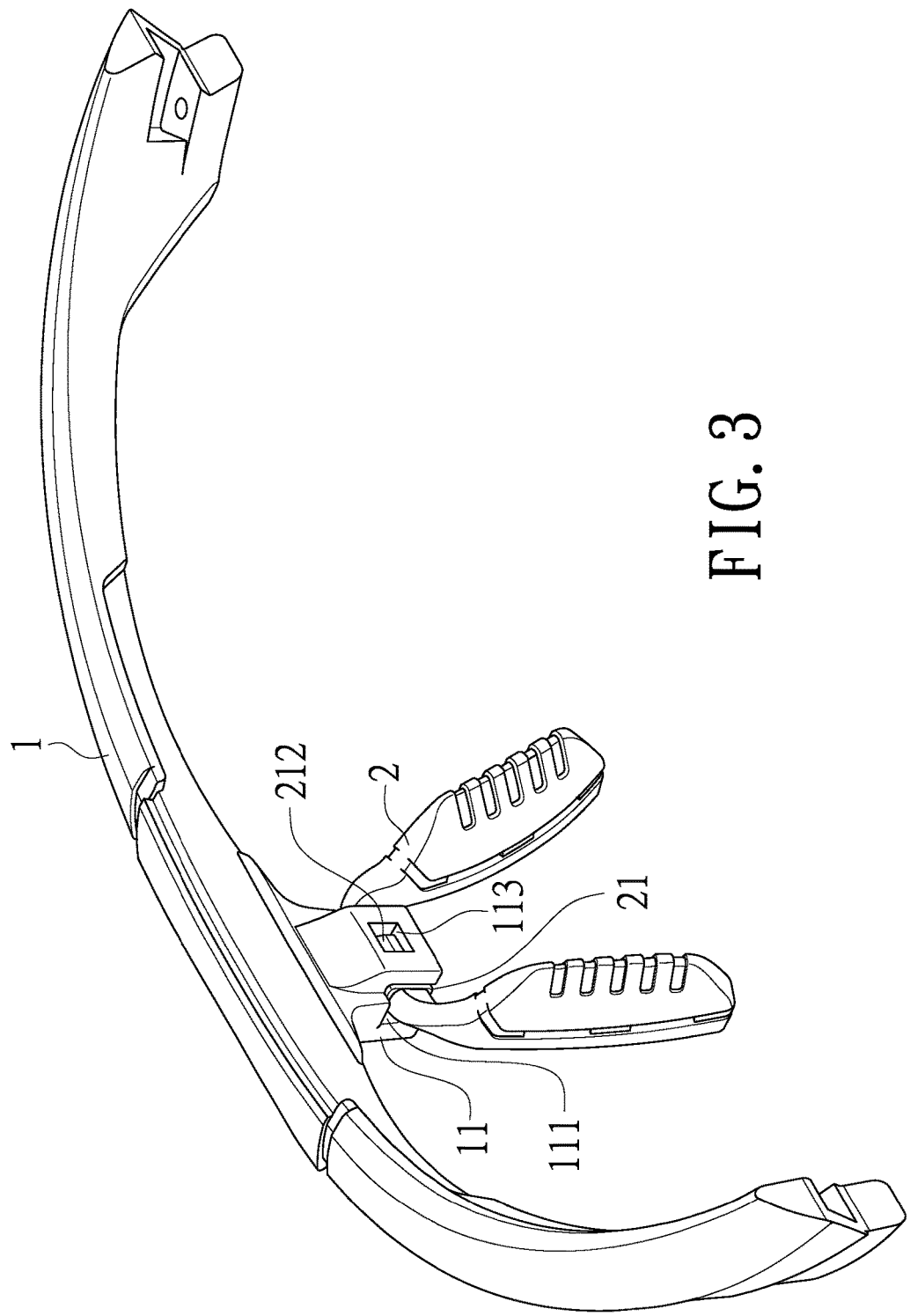
FIG. 3 is a stereogram showing an eyeglasses assembly structure having a nose support in assembly according to the present invention.
Figure 4:
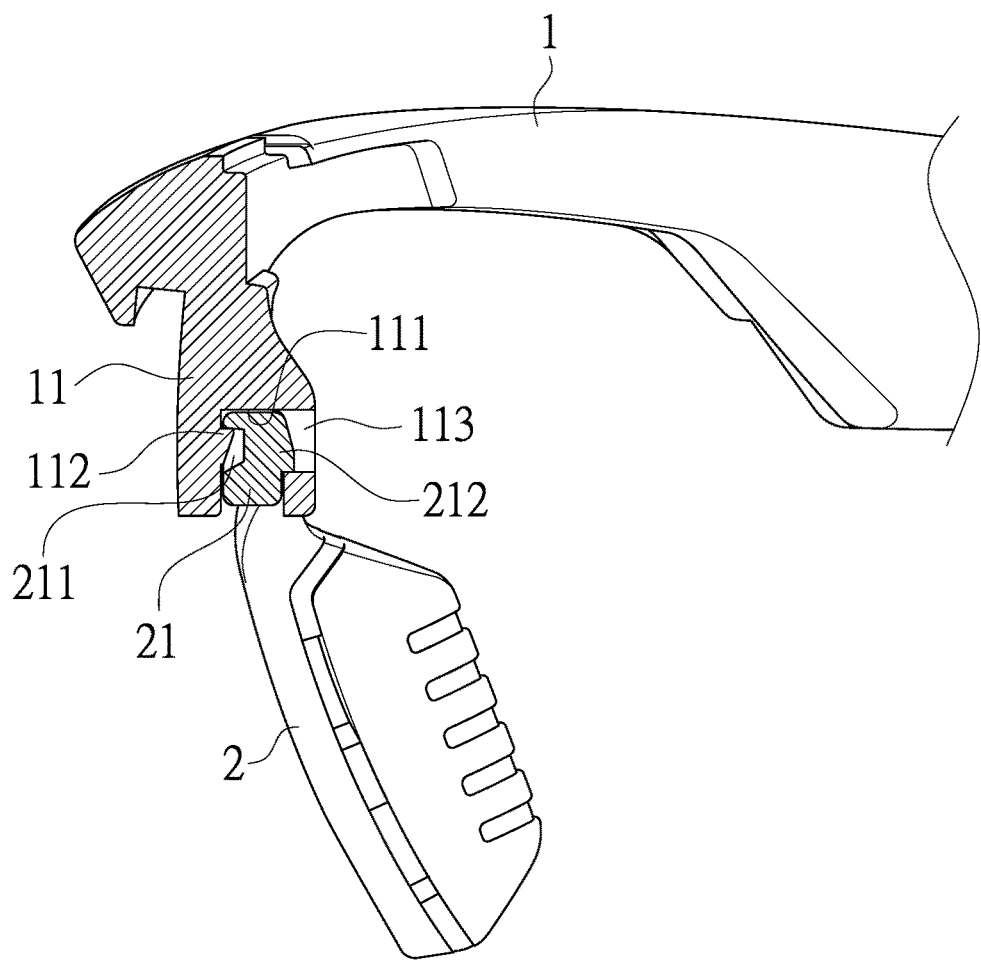
FIG. 4 is a cross-sectional diagram showing an eyeglasses assembly structure having a nose support in assembly according to the present invention.

Referring to FIG. 3 and FIG. 4, a stereogram and a cross-sectional diagram showing an eyeglasses assembly structure having a nose support in assembly according to the present invention are disclosed. The inserting part (21) of the nose support (2) is correspondingly engaged with the receiving slot (111) of the assembly holder (11) of the frame (1). Meanwhile, the engaging slot (211) of the first outer surface of the inserting part (21) is correspondingly engaged with the protrusion (112) of the first inner surface of the receiving slot (111), and the engaging block (212) of the second outer surface of the inserting part (21) is correspondingly engaged with the recess (113) of the second inner surface of the receiving slot (111). Therefore, the nose support (2) can be steadily attached to the frame (1).

According to the above description, in comparison with the traditional technique, an eyeglasses assembly structure according to the present invention has the advantages of being assembled or disassembled from the frame easily without the need of other tools and thus preventing detachment from the frame accidentally. Furthermore, the inserting part is engaged with an interior of the assembly holder so that the overall appearance of a pair of glasses is unaffected by the bonding elements.

What is claimed is:

1. An eyeglasses assembly structure having a nose support, comprising:
   a frame having an assembly holder disposed in a middle bottom portion thereof, wherein the assembly holder is provided with a receiving slot, and the receiving slot is provided with a first inner surface having a protrusion thereof and a second inner surface having a recess thereon; and
   a nose support having an inserting part in a middle portion thereof to engage with the receiving slot of the assembly holder of the frame, wherein the inserting part is provided with a first outer surface having an engaging slot for correspondingly engaging with the protrusion of the first inner surface of the receiving slot, and a second outer surface having an engaging block for correspondingly engaging with the recess of the second inner surface of the receiving slot.

* * * * *